July 31, 1945.　　　　J. W. OWENS　　　　2,380,782
HOUSING FOR ELECTRICAL APPARATUS
Filed March 17, 1944
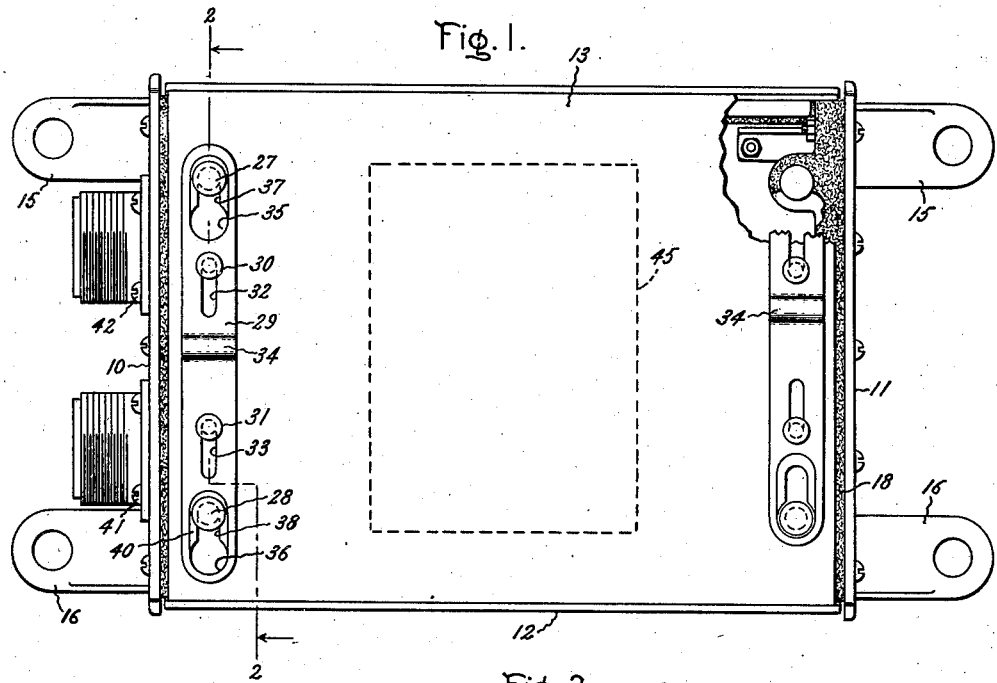
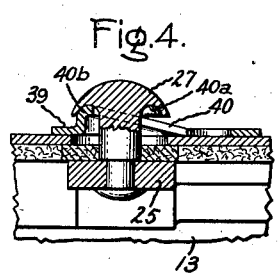
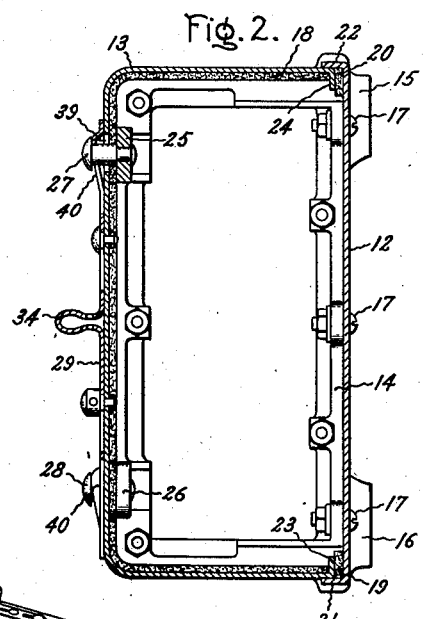
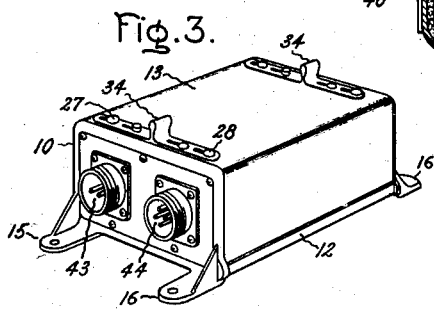
Inventor:
Joseph W. Owens,
by Harry E. Dunham
His Attorney.

Patented July 31, 1945

2,380,782

UNITED STATES PATENT OFFICE 2,380,782

HOUSING FOR ELECTRIC APPARATUS

Joseph W. Owens, Schenectady, N. Y., assignor to General Electric Company, a corporation of New York Application March 17, 1944, Serial No. 526,989

3 Claims. (Cl. 220—55)

My invention relates to housings for electric apparatus, more particularly to dust-tight vibration-proof housings, for electric control apparatus and has for its object a simple, reliable and low cost housing with quickly detachable latching means for the cover of the housing.

In carrying out my invention in one form I provide a yieldable gasket around the edge of the cover, together with quickly operable slider means for clamping and securing the cover tightly in place on the gasket. This slider means comprises a member slidably mounted on the cover and provided with an opening through which projects a headed stud on the base of the enclosure. The slider member is furthermore provided with a slot registering with the opening and receiving the stud when the slider is moved, the walls of this slot being inclined in engaging the head of the stud so as to clamp tightly the cover on the base.

For a more complete understanding of my invention, reference should be had to the accompanying drawing, Fig. 1 of which is a plan view of an enclosure for electric apparatus embodying my invention; Fig. 2 is a sectional view of Fig. 1 taken along the line 2—2 of Fig. 1 looking in the direction of the arrows; Fig. 3 is a view in perspective on a reduced scale of the device shown in Figs. 1 and 2; while Fig. 4 is a fragmentary view mainly in section showing details of construction.

Referring to the drawing, in one form of my invention I provide a base member comprising two end portions 10 and 11 which are preferably cast from a suitable metal. These end members are connected together by a bottom sheet of metal 12.

To facilitate the connection of the plate 12 to the end members and also the detachable securing of a U-shaped cover member 13 to the end members, the end members are each provided with a peripheral flange 14 on its inner side. Also, each end member is provided with a pair of feet 15 and 16. Thus the plate 12 is secured at each end to the bottom portion of the flange 14, as shown in Fig. 2, by means of small bolts 17.

For the purpose of providing a tight connection, a flexible or resilient gasket 18 made, for example, of a felt fabric, is suitably secured as by gluing around the remaining three sides of the flange on each end member 10 and 11. Also, narrow strips 19 and 20 of this gasket material are provided along the opposite sides of the plate 12, the edges of the plate having turned up portions 21 and 22 against which the gaskets 19 and 20 are positioned and inside of which the lower ends 23 and 24 of the cover 13 are seated. The lower ends 23 and 24 of the cover are bent over at right angles to form a flange on each end which bear against the gaskets 19 and 20.

For the purpose of securing the cover 13 in place, each end portion is provided with two inwardly extending projections 25 and 26 at the top which are extensions of the flange extending around it. Secured to these two projections 25 and 26 are studs 27 and 28 respectively provided with round heads and provided with means for detachably securing the cover 13 in place.

Cooperating with the heads of the studs 27 and 28 at each end of the cover is a slider member 29 which consists of a strip of metal slidably secured to the upper side of the cover by means of headed studs 30 and 31 secured to the cover and extending through slots 32 and 33 in the slider 29. At approximately its center the slider is provided with a projection 34 formed by bending a loop in the strip extending at right angles to the length of the strip, which projection 34 forms a handle for sliding the strip back and forth from one position to another. Also if desired the strip may be straight with a part welded to it to form the handle 34.

At its opposite ends the slider 29 is provided with holes 35 and 36 which are large enough to provide for the free insertion through them of the heads of the studs 27 and 28, as indicated at the right-hand end of Fig. 1. Also, at its ends the slider is provided with slots 37 and 38 extending lengthwise of the slider and communicating with the holes 35 and 36 respectively. These slots extend upwardly, as viewed in Fig. 1, from the holes. They are narrower than the holes and wide enough to provide for the free movement of the shanks of the studs 27 and 28 into the slots when the slider is moved in a downward direction, as seen in Fig. 1, after the cover is put in place. It will be understood that the cover is provided with openings which register with the studs 27 and 28, one of these openings 39 being indicated in Fig. 2.

In order to clamp the cover tightly against the gasket strips 18, 19 and 20, the opposite sides of each of the slots 37 and 38 are pressed or shaped with inclined surfaces so as to exert a wedging action on the under surface of the heads of the studs. This is shown clearly in the enlarged fragmentary view of Fig. 4 in which the side of the slot has an inclined portion 40. Also the head of the stud 27 has an annular groove 40a in its lower side, in which groove fits the upper rounded raised end wall 40b of the slot.

This quickly detachable securing and clamping means forms an effective dust-tight seal between the cover and the base. After the cover has been put in place, the latching strip 29 is moved to its downward position, as seen at the left-hand end of Fig. 1, in which the inclined walls 40 on each side of each of the slots bear against the heads of the studs and thereby clamp the cover tightly in place. Moreover, the raised end 40b of the slot wall snaps into the groove 40a in the stud when the strip 29 reaches the end of its travel whereby the strip is securely latched in the engaged position (Fig. 4) against vibration. To remove the cover the slider 29 is moved upward, as seen in Fig. 3, until the holes 35 and 36 register with the heads of the studs.

If desired and as shown, the end members 10 and 11 may be provided with central openings in which are fitted metal plates held in place by screws 41 and 42. These plates are provided with suitable openings and conduit fittings 43 and 44 through which electric connections may extend to the electric apparatus in the interior of the enclosure. The electric apparatus, indicated by the dotted rectangle 45 in Fig. 1, is secured as with suitable bolts (not shown) to the sheet 12.

While I have shown a particular embodiment of my invention, it will be understood, of course, that I do not wish to be limited thereto, since many modifications may be made and I therefore contemplate by the appended claims to cover any such modifications as fall within the true spirit and scope of my invention.

What I claim as new and desire to secure by Letters Patent of the United States, is:

1. A housing comprising a base, a cover, at least one stud on said base, said cover being provided with an aperture through which said stud extends and said stud being provided with a head, and a slider member slidably secured to said cover provided with a slot through which said stud extends, said slot being provided with inclined side walls terminating in a raised end wall for engaging said head when said slider is moved thereby to clamp said cover on said base, said head being provided with a groove in its lower side for receiving said raised end wall thereby to secure said slider member in a clamping position.

2. A housing comprising two end members each provided with a peripheral flange, a bottom member having opposite ends connected to portions of said flanges respectively, strips of resilient gasket material extending along the remaining portions of said flanges, at least one stud on each of said flanges, a cover extending between said end members having its ends engaging said strips of gasket material on said flanges, said cover being provided with an aperture at each end through which one of said studs extends and each of said studs being provided with a head, and a slider member slidably secured to said cover over each of said apertures provided with a slot through which one of said studs extends, said slot being provided with inclined side walls for engaging said head when said slider is moved thereby to clamp said cover on the corresponding one of said gaskets.

3. A housng for electric apparatus comprising two end members, each provided with a peripheral flange, a bottom plate having opposite ends connected to portions of said flanges on said end members, turned up portions along the sides of said bottom plate, a strip of resilient gasket material extending along the sides of said bottom plate and over the remaining portions of said flanges on said end members, a cover U-shaped in transverse cross section having turned over portions on its longitudinal edges engaging the gasket strips on said bottom plate and having its ends engaging the gasket strips on said end members, at least one stud on each of said end members, said cover being provided with apertures through which said studs extend and said studs being provided each with a head, and a slider latch member for each of said studs secured slidably to said cover and provided with an aperture through which its stud extends and with a slot provided with inclined side walls for engaging the head on its stud when said slider is moved thereby to clamp said cover on said gasket.

JOSEPH W. OWENS.